July 8, 1930.  J. SLISZ  1,770,090
CURRENT LIMITING DEVICE
Filed April 20, 1927  2 Sheets-Sheet 1

INVENTOR
John Slisz

July 8, 1930.  J. SLISZ  1,770,090
CURRENT LIMITING DEVICE
Filed April 20, 1927   2 Sheets-Sheet 2

INVENTOR
John Slisz

Patented July 8, 1930

1,770,090

UNITED STATES PATENT OFFICE

JOHN SLISZ, OF EAST ST. LOUIS, ILLINOIS, ASSIGNOR OF ONE-HALF TO JAMES B. BROCKMAN, OF ST. LOUIS, MISSOURI

CURRENT-LIMITING DEVICE

Application filed April 20, 1927. Serial No. 185,335.

The invention relates to a current limiting device, which may be used for controlling the current flowing through an electrical circuit so as to prevent overload and the injury resulting therefrom. The device may be used in various relations and to protect any desired object, as for example, to prevent overloads on lamp sockets, on motors, on branch circuits, on a storage battery discharge, and in all relations in which the limiting of current flow to a definite amount is desired.

The current limiting device is placed in an electric circuit between the line and the load, and in its preferred embodiment comprises a pair of electromagnets having coils of relatively low resistance arranged in series with each other, the said electromagnets having a single armature, which, during normal load is held by means of a spring against a pair of contacts, the series coils, contacts and armature being included in the circuit during normal load, the armature, however, being withdrawn during overload and held in retracted position by the action of a pair of high resistance coils which are shunted across the line in such a manner as to bridge the armature. The shunt coils are of high resistance, and consequently do not permit a harmful amount of current to pass through the load to be protected. As soon as the overload ceases the armature is forced back to its normal position and the normal flow of current passes therethrough from the load to the line.

The invention also comprises a novel form of electromagnet, and a novel form of armature, as well as other novel features which will be apparent from the further description of the invention.

An illustrative embodiment of the invention is shown in the accompanying drawings in which, Figure 1 is a front view of the current limiting device, partly in section and partly in elevation, showing the low resistance electromagnets, and showing the armature which serves for both coils, in the position of the normal load.

Figure 1:
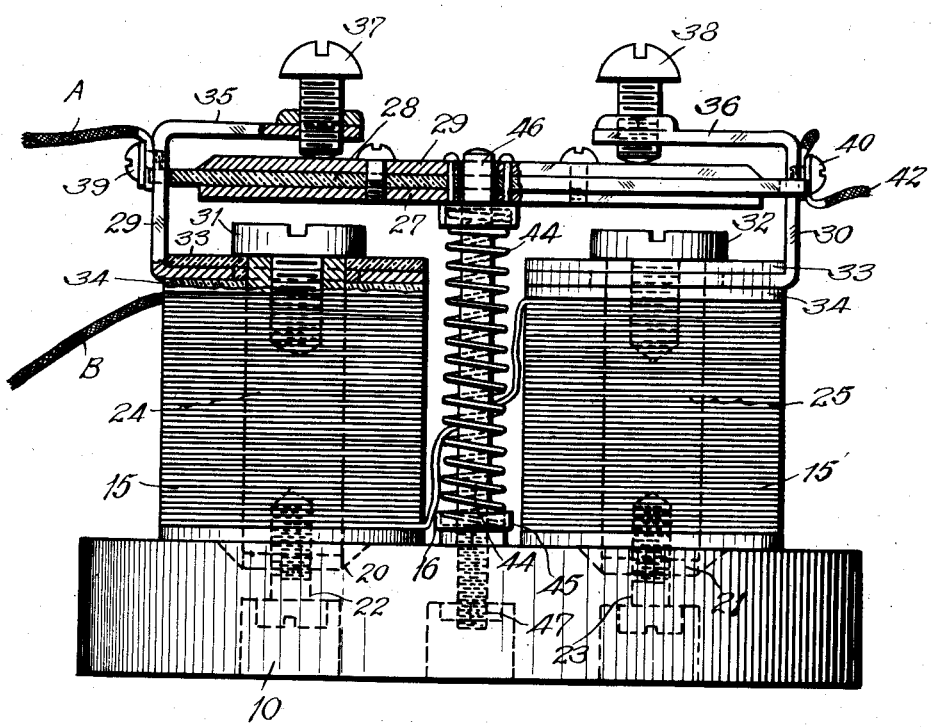

In the drawings the reference numeral 10 denotes a suitable base of insulating material upon which the current limiting device may be mounted. Mounted on this base are four spools 11, 12, 13 and 14. The spools 11 and 12 are wound with low resistance wire 15, which form the coils of two electromagnets. These coils are connected with each other by the wire 16. The spools 13 and 14 are wound with high resistance wire, the windings being connected together by a wire 17. The coils 13 and 14 will hereinafter be termed the shunt coils and the coils 11 and 12 will be termed the series coils.

Upon the base 10, and extending beneath the spools 11, 13, 12, 14 are a pair of yokes 20, 21, which may be composed of laminated soft steel or soft cast iron. Where the device is used with A. C. current, silicon steel laminations are preferably used in order to avoid reluctance in the iron. With D. C. current apparatus, ordinary steel or even soft cast iron may be used.

The yokes 20, 21 are U-shaped and furnish a magnetic path between the series and shunt coils. These yokes are held in place by means of screws, two of which are shown in Fig. 1 at 22, 23, likewise serve to hold in position the cores 24, 25, of the series coils, which cores form the front ends of the U-shaped yokes, while the rear ends of the yokes form the cores of the shunt coils 13, 14. A bar 26 of magnetic material similar to the yokes 20, 21, connects the cores of the shunt coils, while an armature 27 is provided for the cores 24, 25 of the series coils. Thus, when the armature is retracted upon the cores 24, 25, a complete magnetic circuit over a continuous path is provided.

The armature is preferably of sectional construction and consists of three plates 27, 28, 29. The upper or current carrying plate 29 may be made of any good conductor, such as copper, brass, bronze or carbon.

The middle section 28 is made up of hard non-absorbent insulating material, and is longer than the upper and lower sections, its function being to hold the armature in position, and to render short circuiting impossible. The third or lower section 27 which constitutes the armature proper, is made of soft steel laminations or cast iron, having high permeability to magnetic flux. The same material may be used for the plate 27 as is employed for the yokes 21, 22 and bar 26. The armature is slidably supported upon clips 29, 30 which are secured upon the tops of the series coils by means of screws 31, 32, but insulated therefrom by means of fiber bushings 33, 34. The center section 28 of the armature is slotted to pass over the clips 29, 30. These clips are bent over at 35, 36 and adjustable contacts 37, 38 pass through these bent over portions. The coils 13 and 14 are connected in shunt with the contacts 37 and 38 as clearly indicated in Fig. 4.

Binding screws 39, 40 are provided for inlet and outlet wires A, 42 respectively, the current passing in through wire 41, over clip 35, contact 37, plate 29 contact 38, clip 36, and out through the wire 42 when the armature is in the raised position shown in Fig. 1.

The armature may be held in contact with screws 37, 38, during normal load by means of a spiral spring 44 which bears at its upper end against the armature and at its lower end is set in a cup 45 which is carried by a rod 46 which is adjustably secured in the insulating base 10 by screw means 47. The upper end of the rod 46 passes through an aperture in the armature, so that by adjusting the screw 47 the tension of the spring 46 may be regulated, and accordingly the amount of magnetic force required to operate the armature on over load may be predetermined at any given amount.

The foregoing detailed description of the device is for the purpose of illustration, but it will be understood that the invention is not to be limited to such details.

Figure 2:
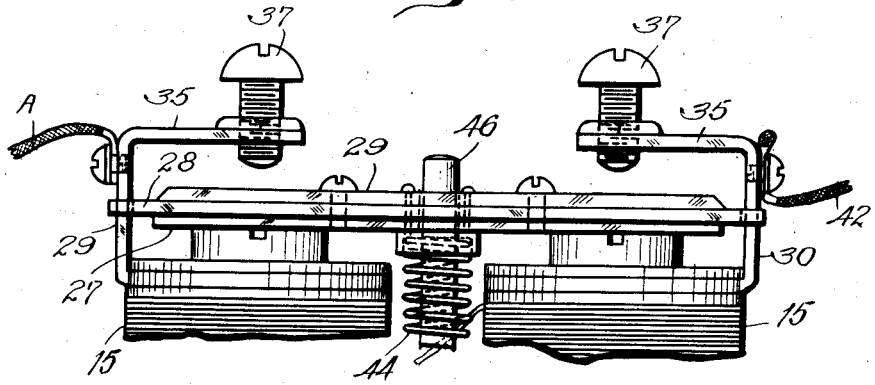
Fig. 2 is a fragmentary view showing the armature in the retracted position which it occupies during overload.
Figure 3:
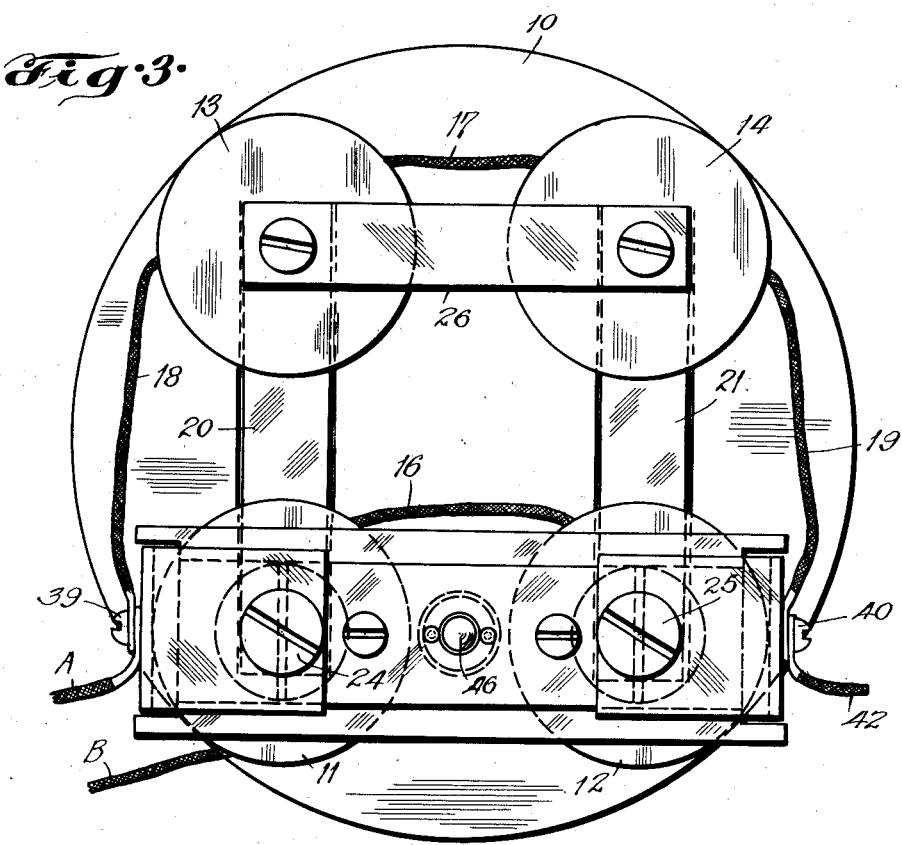
Fig. 3 is a top plan view of the current limiting device, showing both the high and low resistance coils, and the connections therebetween.
Figure 4:
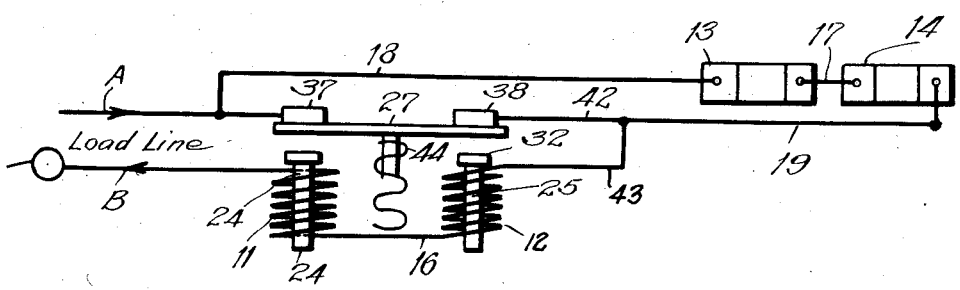
Fig. 4 is a diagrammatic view showing the arrangement of the current limiting device in a circuit.

Fig. 4 is a wiring diagram showing the electrical connections, but omitting the magnetic connections, so that for a full understanding of the operation of the device, reference must be also had to Figs. 1, 2 and 3 which have just been described in detail. In Fig. 4, the parts which have been referred to in Figs. 1, 2 and 3 are given similar reference numerals.

The operation of the device will be evident from the foregoing description. Assuming that direct current is being supplied, the current enters through lead A from any suitable source of supply, and during normal load passes thence through contact 37, armature 27, contact 38, lead 42, thence back through lead 43, through series coil 12, wire 16, series coil 11 and out to lead through B.

During normal load the current through coils 11, 12 is not sufficient to overcome the tension of the spring 44 and to retract the armature 27, but in case of overload, exceeding a predetermined amount, the armature 27 is withdrawn and the direct circuit above described is broken.

During the normal load the resistance of the shunt coils 13, 14 is sufficient to prevent any appreciable quantity of current from flowing therethrough when, however, the path through armature 27 and series coils 11, 12 is broken on overload, the current is forced through the high resistance shunt coils 13, 14, through wire 18, coil 13, wire 17, coil 14, wire 19, wire 43, series coil 12, wire 16, series coil 11 and lead B. Thus, the added resistance of the coils 13 and 14 prevents damage to the load due to excess current.

The magnetic force generated by the coils 13, 14 and acting through the yokes 20, 21 is sufficient to hold the armature 27 against the contacts 31, 32 of the cores 24, 25, during the duration of the overload. When, however, the overload ceases, the tension of the spring 44 serves to return the armature to normal position against contacts 37, 38, thus again closing the normal circuit, and substantially cutting out the shunt coils 13, 14, on account of their high resistance.

The device may be adjusted to operate at any particular overload by merely adjusting the tension of the spring 44, and further adjustment by adjusting screws 37, 38 so as to position the armature nearer or farther from the screws 31, 32, as described.

The apparatus may be of varying construction depending on the service required.

It may be employed to limit the current supplied to any machine, circuit, lighting outlet or any other device which consumes an amount of electrical energy equal to its safe carrying capacity, and the current limiting device prevents destruction of material, fire hazards and other losses.

The present apparatus is superior to a fuse in that no dead short circuit can be created with a limiter, as long before a dead short circuit can be made, sufficient magneto-force will be built up, to cause the limiter to operate. This is not the case with a fuse, which will often drag long after a safe limit has been reached, thus causing danger to the installation it is designed to protect. The limiter is self-restoring and does not require manual handling to restore the line to operation after the limiter has functioned.

What I claim and desire to secure by Letters Patent is:

1. An electro-magnet comprising in combination, a pair of coils adapted to be connected in series with each other and with a source of current, each coil having a magnetic core extending therethrough, metallic clips mounted on said cores but insulated therefrom, one clip for each coil, each clip being electrically connected to its coil, and extending upwardly therefrom, an armature and contact member slidably carried by said clips but insulated therefrom, and held by said clips parallel to the upper faces of said cores, resilient means, acting in opposition to the magnetic force of said coils tending to hold the armature away from said cores, and adjustable means for limiting the movement of said armature away from said cores.

2. A laminated armature for electro-magnets comprising in combination, a metal plate of high electric conductivity, a metal plate of high magnetic properties, and an interposed non-conducting plate, the non-conducting plate extending beyond the other two plates.

3. A laminated armature comprising, in combination, a copper plate, an iron plate, and an intermediate plate of insulating material which is longer than the other two plates.

4. In combination with a pair of coils connected in series and having suitable magnetic cores, a pair of clips extending upwardly from the coils, each electrically connected to one of the coils, but insulated from the core thereof, said clips having overhanging portions parallel to the upper faces of the coils, a laminated armature slidably mounted on said clips comprising an upper conducting section, a lower section of magnetic material, and an intermediate section of insulating material, the insulating section being longer than the other sections and slidably mounted on the upright portions of said clips, resilient means tending to force said armature away from the coils, and adjustable contact screws mounted in the overhanging portions of said clips for limiting the movement of the armature away from the coils and for completing a circuit through the conducting plate of the armature, and including the metallic clips and said coils.

5. In a device of the character described comprising an insulating base, a pair of series coils mounted thereon and having an armature and contacts therefor, and a pair of shunt coils likewise mounted on said base and connected in shunt with said contacts, all said coils having cores resting upon said base, a metal strap on said base connecting the cores of said shunt coils with each other, and a pair of straps parallel with each other, each connecting one of the cores of a series coil with one of the cores of a shunt coil, all said straps being of material having high magnetic permeability.

JOHN SLISZ.